(12) United States Patent
Ernst et al.

(10) Patent No.: US 9,516,919 B2
(45) Date of Patent: Dec. 13, 2016

(54) SOLE STRUCTURE WITH BLADDER FOR ARTICLE OF FOOTWEAR AND METHOD OF MANUFACTURING THE SAME

(71) Applicant: NIKE, Inc., Beaverton, OR (US)

(72) Inventors: Travis K. Ernst, Portland, OR (US); Eric S. Schindler, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 14 days.

(21) Appl. No.: 14/487,981

(22) Filed: Sep. 16, 2014

(65) Prior Publication Data
US 2016/0073732 A1    Mar. 17, 2016

(51) Int. Cl.
  *A43B 13/18*  (2006.01)
  *B29C 65/70*  (2006.01)
  *A43B 13/20*  (2006.01)
  *B29D 35/14*  (2010.01)
  *B29D 35/00*  (2010.01)

(52) U.S. Cl.
  CPC ............. *A43B 13/181* (2013.01); *A43B 13/20* (2013.01); *B29C 65/70* (2013.01); *B29D 35/142* (2013.01); *B29D 35/148* (2013.01); *B29D 35/0054* (2013.01)

(58) Field of Classification Search
  None
  See application file for complete search history.

(56) References Cited

U.S. PATENT DOCUMENTS

2009/0151093 A1    6/2009 Schindler et al.

OTHER PUBLICATIONS

International Searching Authority, International Search Report and Written Opinion for International Application No. PCT/US2015/050331, mailed Dec. 15, 2015.

*Primary Examiner* — Monica Huson
(74) *Attorney, Agent, or Firm* — Honigman Miller Schwartz and Cohn LLP; Matthew H. Szalach; Jonathan P. O'Brien

(57) ABSTRACT

A method of manufacturing a sole structure includes providing a plate within a cavity of a mold. The plate includes a base and a rib, and the base includes a first surface and a second surface. The first surface faces the upper, the second surface faces away from the first surface, and the rib projects from the second surface of the base. Moreover, the method includes providing a preform bladder member within the cavity of the mold, wherein the preform bladder member including a first member and a second member. The method additionally includes forming a bladder from the first and second members using the mold. Also, the method includes attaching the first member to the plate using the mold. Attaching the first member to the plate includes shaping the first member according to surfaces of the rib.

16 Claims, 9 Drawing Sheets

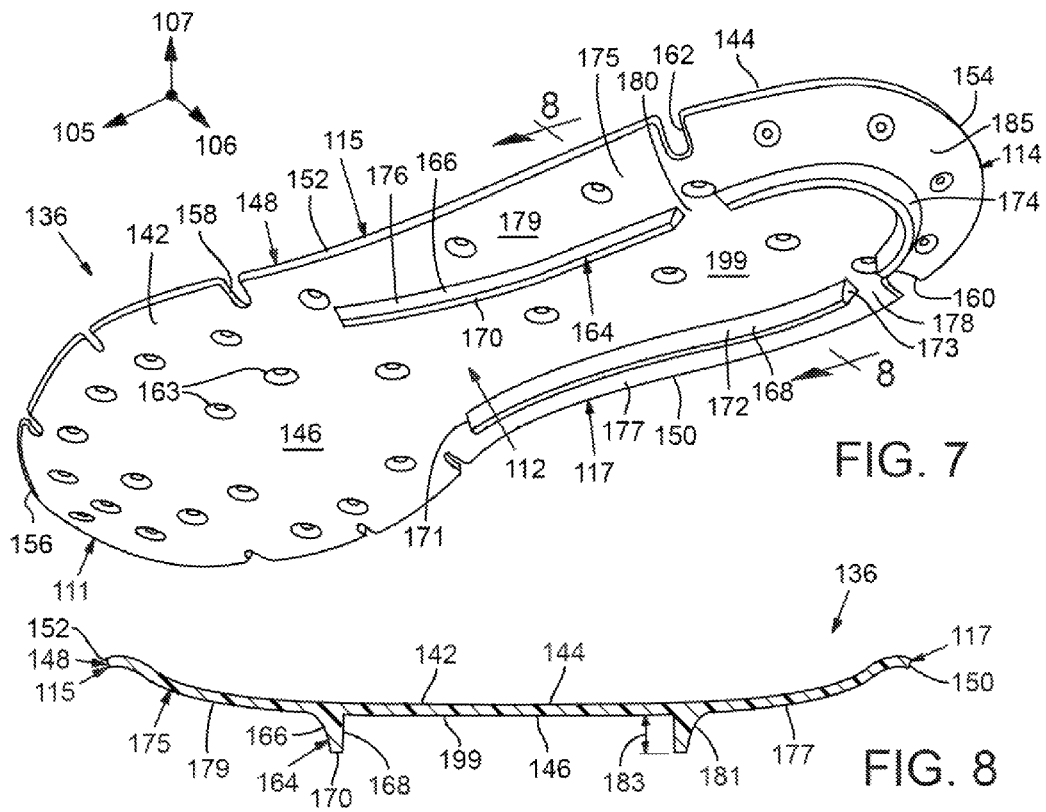
FIG. 7
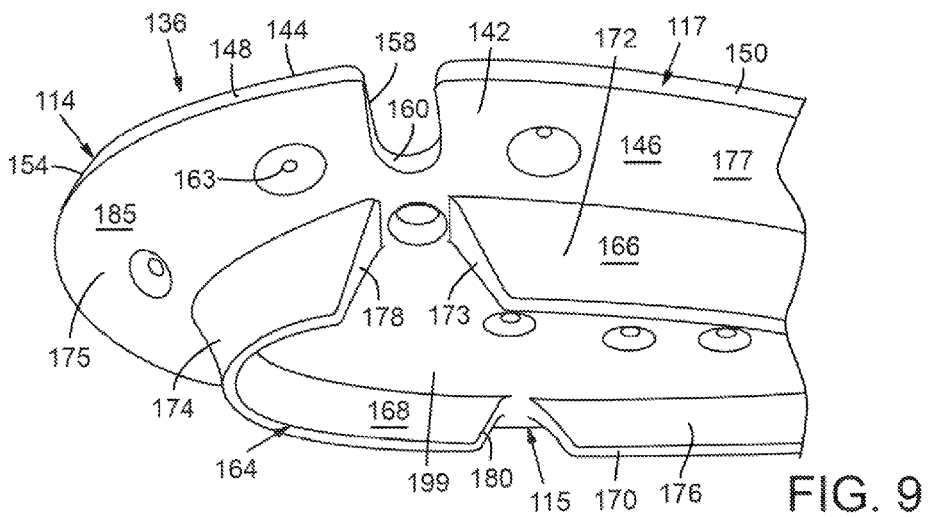
FIG. 8
FIG. 9

SOLE STRUCTURE WITH BLADDER FOR ARTICLE OF FOOTWEAR AND METHOD OF MANUFACTURING THE SAME

BACKGROUND

Articles of footwear generally include two primary elements: an upper and a sole structure. The upper is formed from a variety of material elements (e.g., textiles, foam, leather, and synthetic leather) that are stitched or adhesively bonded together to form a void on the interior of the footwear for comfortably and securely receiving a foot. An ankle opening through the material elements provides access to the void, thereby facilitating entry and removal of the foot from the void. In addition, a lace is utilized to modify the dimensions of the void and secure the foot within the void.

The sole structure is located adjacent to a lower portion of the upper and is generally positioned between the foot and the ground. In many articles of footwear, including athletic footwear, the sole structure conventionally incorporates an insole, a midsole, and an outsole. The insole is a thin compressible member located within the void and adjacent to a lower surface of the void to enhance footwear comfort. The midsole, which may be secured to a lower surface of the upper and extends downward from the upper, forms a middle layer of the sole structure. In addition to attenuating ground reaction forces (i.e., providing cushioning for the foot), the midsole may limit foot motions or impart stability, for example. The outsole, which may be secured to a lower surface of the midsole, forms the ground-contacting portion of the footwear and is usually fashioned from a durable and wear-resistant material that includes texturing to improve traction.

The conventional midsole is primarily formed from a foamed polymer material, such as polyurethane or ethylvinylacetate, that extends throughout a length and width of the footwear. In some articles of footwear, the midsole may include a variety of additional footwear elements that enhance the comfort or performance of the footwear, including plates, moderators, fluid-filled chambers, lasting elements, or motion control members. In some configurations, any of these additional footwear elements may be located between the midsole and either of the upper and outsole, embedded within the midsole, or encapsulated by the foamed polymer material of the midsole, for example. Although many conventional midsoles are primarily formed from a foamed polymer material, fluid-filled chambers or other non-foam structures may form a majority of some midsole configurations.

Various techniques may be utilized to form fluid-filled chambers for articles of footwear or other products, including a two-film technique, a thermoforming technique, and a blow-molding technique, for example. In the two-film technique, two separate polymer sheets are bonded together at specific locations. The thermoforming technique is similar to the two-film technique in that two polymer sheets are bonded together, but also includes utilizing a heated mold to form or otherwise shape the polymer sheets. In the blow-molding technique, a parison formed from a molten or otherwise softened polymer material is placed within a mold having a cavity with the desired configuration of the chamber. Pressurized air induces the polymer material to conform with surfaces of the chamber. The polymer material then cools and retains the shape of the cavity, thereby forming the chamber.

Following each of the techniques discussed above, the chambers are pressurized. That is, a pressurized fluid is injected into the chambers and then sealed within the chambers. One method of pressurization involves forming inflation conduits in residual portions of the polymer sheets or the parison. In order to pressurize the chambers, the fluid is injected through the inflation conduits, which are then sealed. The residual portions of the polymer sheets or the parison, including the inflation conduits, are then trimmed or otherwise removed to substantially complete manufacture of the chambers.

SUMMARY

A method of manufacturing a sole structure for an article of footwear is disclosed. The sole structure is configured to be attached to an upper of the article of footwear. The method includes providing a plate within a cavity of a mold. The plate includes a base and a rib. Also, the base includes a first surface and a second surface. The first surface is configured to face the upper, the second surface faces away from the first surface, and the rib projects from the second surface of the base. Moreover, the method includes providing a preform bladder member within the cavity of the mold, wherein the preform bladder member including a first member and a second member. The method additionally includes forming a bladder from the first member and the second member using the mold. The bladder includes an interior chamber configured to contain a fluid. Also, the method includes attaching the first member to the plate using the mold. Attaching the first member to the plate includes shaping the first member according to surfaces of the rib.

Additionally, a sole structure for an article of footwear is disclosed. The sole structure is configured to support an upper of the article of footwear. The sole structure includes a plate with a base and at least one rib. The base includes a first surface and a second surface. The first surface is configured to face the upper, the second surface faces away from the first surface, and the rib projects from the second surface of the base. Additionally, the sole structure includes a bladder that includes a first member and a second member that are spaced apart to define an interior chamber within the bladder. The rib includes a first side surface, a second side surface, and an end surface that extends between the first and second side surfaces. The first side surface and the second side surface extend away from the second surface of the base. The end surface faces generally away from the second surface of the base. Additionally, the first member of the bladder is attached to the first side surface, the second side surface, and the end surface of the rib.

Moreover, a method of manufacturing a sole structure for an article of footwear is disclosed. The sole structure is configured to be attached to an upper of the article of footwear. The method includes providing a plate within a cavity of a mold. The plate includes a base and a rib. The base includes a first surface and a second surface, the first surface is configured to face the upper, and the second surface faces away from the first surface. The rib projects from the second surface of the base. Also, the plate including an outer peripheral edge. The method further includes providing a preform bladder member within the cavity of the mold, and the preform bladder member includes a first member and a second member. Moreover, the method includes forming a bladder from the first member and the second member using the mold. The bladder includes an interior chamber configured to contain a fluid. Additionally, the method includes attaching the first member to the plate using the mold. Attaching the first member to the plate includes shaping the first member according to surfaces of the rib. Furthermore, the rib includes a first side surface, a second side surface, and an end surface. The first side surface and the second side surface extend away from the second surface of the base, and the end surface extends between the first and second side surfaces. The rib is spaced from the outer peripheral edge to define an outer area of the second surface. The outer area extends from the peripheral edge to the rib. The rib includes a first segment and a second segment, and an intermediate area of the second surface is defined between the first segment and the second segment. Attaching the first member to the plate includes continuously layering the first member across the outer area, the first side surface, the second side surface, the end surface, and the intermediate area. Additionally, forming the bladder includes layering the second member on the first member at an attachment area. The attachment area is layered on the intermediate area and the second side surface.

Other systems, methods, features and advantages of the present disclosure will be, or will become, apparent to one of ordinary skill in the art upon examination of the following figures and detailed description. It is intended that all such additional systems, methods, features and advantages be included within this description and this summary, be within the scope of the present disclosure, and be protected by the following claims.

BRIEF DESCRIPTION OF THE DRAWINGS

The present disclosure can be better understood with reference to the following drawings and description. The components in the figures are not necessarily to scale, emphasis instead being placed upon illustrating the principles of the present disclosure. Moreover, in the figures, like reference numerals designate corresponding parts throughout the different views.

FIG. 7 is a bottom perspective view of a plate of the sole structure of FIG. 5;

FIG. 8 is a section view of the plate taken along the line 8-8 of FIG. 7;

FIG. 9 is a bottom perspective view of a heel region of the plate of FIG. 7;

DETAILED DESCRIPTION

Example embodiments will now be described more fully with reference to the accompanying drawings.

The following discussion and accompanying figures disclose sole structures for articles of footwear with various configurations of fluid-filled bladders. The bladder can deform resiliently to attenuate shock or impact loads and/or provide cushioning for the wearer. Structures that support the bladders are also discussed. For example, the bladder can be highly flexible, resilient, compressible, and deformable; however, the supporting structure(s) can provide predetermined stiffness and support to certain areas of the bladder. The supporting structure can also ensure that the bladder is secured within the sole structure and is unlikely to detach, tear, plastically deform, or be otherwise damaged. Methods for manufacturing such sole structures are also discussed in detail below.

It will be appreciated that the sole structure can be incorporated in footwear that is suitable for running or other athletic activity. The concepts of the present disclosure can also be applied to basketball shoes, cross-training shoes, football shoes, golf shoes, hiking shoes and boots, ski and snowboarding boots, soccer shoes, tennis shoes, and walking shoes, for example. Moreover, the footwear of the present disclosure can also include footwear styles that are generally considered to be non-athletic, including dress shoes, loafers, and sandals.

In addition to footwear, the bladders of the present disclosure may be incorporated into other types of apparel and athletic equipment, including helmets, gloves, and protective padding for sports such as football and hockey. Similar bladders may also be incorporated into cushions and other compressible structures utilized in household goods and industrial products. Accordingly, bladders incorporating the concepts disclosed herein may be utilized with a variety of products.

Figure 1:
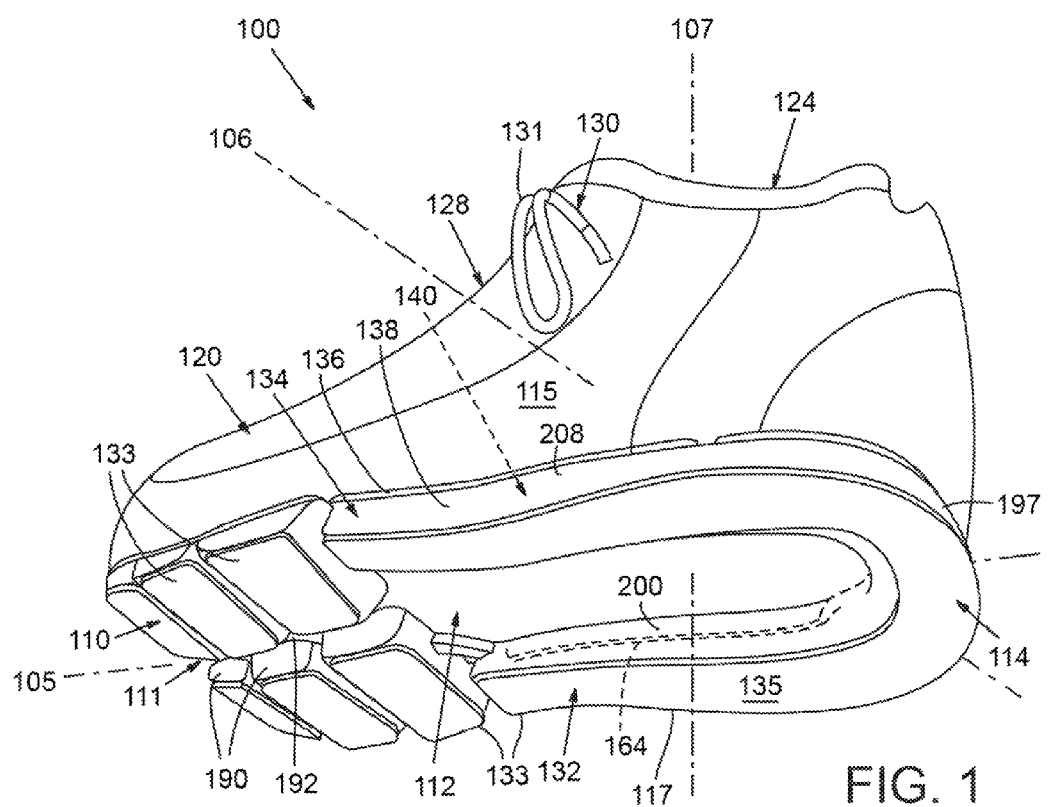
FIG. 1 is a bottom perspective view of an article of footwear according to exemplary embodiments of the present disclosure.
Figure 2:
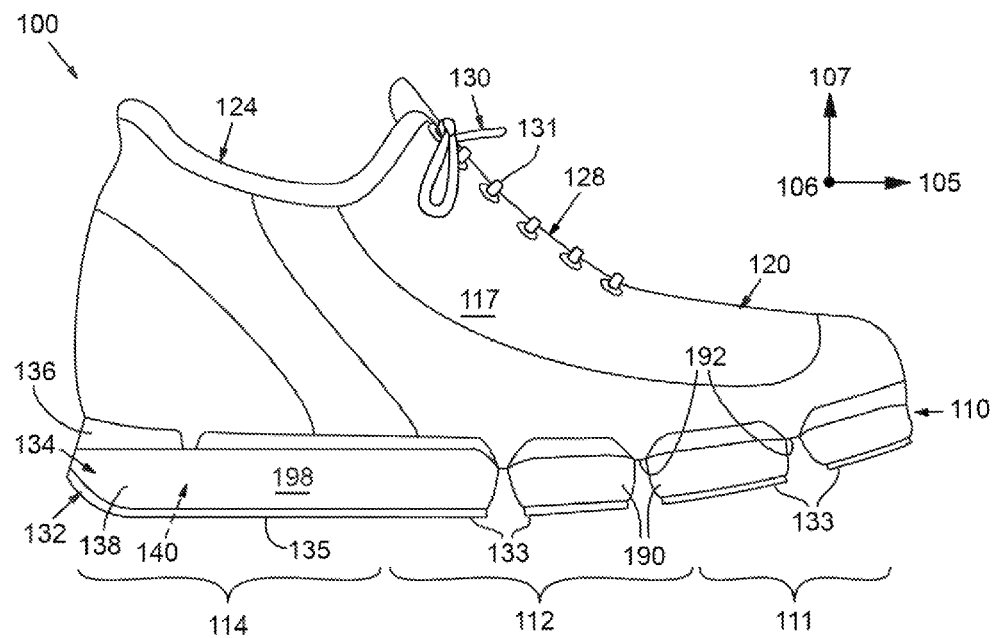
FIG. 2 is a medial side view of the article of footwear of FIG. 1.
Figure 3:
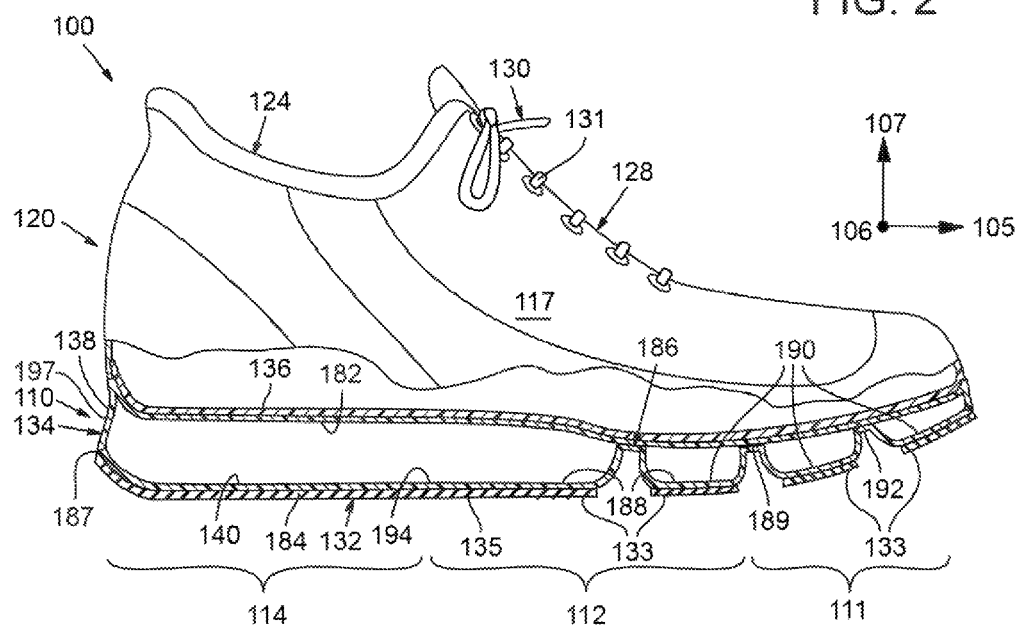
FIG. 3 is a medial side view of the article of footwear of FIG. 1, wherein the sole structure is shown in section.

Referring initially to FIGS. 1-3, an article of footwear 100 is illustrated according to exemplary embodiments. Generally, footwear 100 can include a sole structure 110 and an upper 120. Upper 120 can receive the wearer's foot and secure footwear 100 to the wearer's foot whereas sole structure 110 can extend underneath upper 120 and support wearer.

For reference purposes, footwear 100 may be divided into three general regions: a forefoot region 111, a midfoot region 112, and a heel region 114. Forefoot region 111 can generally include portions of footwear 100 corresponding with forward portions of the wearer's foot, including the toes and joints connecting the metatarsals with the phalanges. Midfoot region 112 can generally include portions of footwear 100 corresponding with middle portions of the wearer's foot, including an arch area. Heel region 114 can generally include portions of footwear 100 corresponding with rear portions of the wearer's foot, including the heel and calcaneus bone. Footwear 100 can also include a lateral side 115 and a medial side 117. Lateral side 115 and medial side 117 can extend through forefoot region 111, midfoot region 112, and heel region 114 in some embodiments. Lateral side 115 and medial side 117 can correspond with opposite sides of footwear 100. More particularly, lateral side 115 can correspond with an outside area of the wearer's foot (i.e. the surface that faces away from the other foot), and medial side 117 can correspond with an inside area of the wearer's foot (i.e., the surface that faces toward the other foot). Forefoot region 111, midfoot region 112, heel region 114, lateral side 115, and medial side 117 are not intended to demarcate precise areas of footwear 100. Rather, forefoot region 111, midfoot region 112, heel region 114, lateral side 115, and medial side 117 are intended to represent general areas of footwear 100 to aid in the following discussion. In addition to footwear 100, regions 111, 112, 114 and sides 115, 117 may also be applied to sole structure 110, upper 120, and individual elements thereof.

Footwear 100 can also extend along various axes. For example, as shown in FIGS. 1-3, footwear 100 can extend along a longitudinal axis 105, a transverse axis 106, and a vertical axis 107. Longitudinal axis 105 can extend generally between heel region 114 and forefoot region 111. Transverse axis 106 can extend generally between lateral side 115 and medial side 117. Also, vertical axis 107 can extend substantially perpendicular to both longitudinal axis 105 and transverse axis 106. It will be appreciated that longitudinal axis 105, transverse axis 106, and vertical axis 107 are merely included for reference purposes and to aid in the following discussion.

Embodiments of upper 120 will now be discussed in greater detail with reference to FIGS. 1-3. Upper 120 can define a void that is configured to receive a wearer's foot. When the wearer's foot is received within void, upper 120 can at least partially enclose and encapsulate the wearer's foot. Thus, upper 120 can extend about forefoot region 111, lateral side 115, heel region 114, and medial side 117 in some embodiments. Given that various aspects of the present disclosure primarily relate to sole structure 110, upper 120 may exhibit the general configuration discussed above or the general configuration of practically any other conventional or non-conventional upper. Accordingly, the overall structure of upper 120 may vary significantly without departing from the scope of the present disclosure.

Upper 120 can also include a collar 124. Collar 124 can define an opening that is configured to allow passage of the wearer's foot during insertion or removal of the foot from upper 120.

Upper 120 can also include a throat 128. Throat 128 can extend from collar 124 toward forefoot region 111. Throat 128 dimensions can be varied to change the width of footwear 100 between lateral side 115 and medial side 117. Thus, throat 128 can affect fit and comfort of article of footwear 100.

Footwear 100 can additionally include a securement device 130 as shown in FIGS. 2 and 3. Securement device 130 can be used by the wearer to adjust the dimensions of the footwear 100. For example, securement device 130 can extend along throat 128 and can be used by the wearer to selectively vary the girth, or width of footwear 100. Securement device 130 can be of any suitable type, such as a shoelace, a strap, a buckle, or any other device. In the embodiment of FIGS. 2 and 3, for example, securement device 130 can include a shoelace 131 that is secured to both lateral side 115 and medial side 117. By tensioning securement device 130, lateral side 115 and medial side 117 can be pulled toward each other to tighten footwear 100 onto the wearer's foot. As such, footwear 100 can be tightly secured to the wearer's foot. By reducing tension in securement device 130, footwear 100 can be loosened, and footwear 100 can be easier to put on or remove from the wearer's foot.

Embodiments of sole structure 110 will now be discussed with reference to FIGS. 1-6. Sole structure 110 is secured to upper 120 and has a configuration that extends between upper 120 and the ground, pavement, track, or other support surface. In effect, therefore, sole structure 110 is located to extend between the foot and the support surface. In addition to attenuating ground reaction forces (i.e., providing cushioning for the foot), sole structure 110 may provide traction, impart stability, and limit various foot motions, such as pronation.

In some embodiments, sole structure 110 can generally include an outsole 134 and a midsole 132. The outsole 134 can provide traction for the article of footwear 100, and the midsole 132 can provide cushioning and support for the wearer's foot.

The outsole 134 can form a lower portion of sole structure 110 and can be positioned to engage the ground. As such, the outsole 134 can define a ground engaging surface 135 of footwear 100. In some embodiments, outsole 134 can include relatively high-friction material, such as rubber, for increasing traction for footwear 100. In some embodiments represented in FIGS. 1-4, outsole 134 can include a plurality of outsole members 133. Outsole members 133 can be disconnected from each other and can be spaced apart across the sole structure 110. Thus, outsole members 133 can cooperate to define the ground engaging surface 135. Moreover, in some embodiments, the outsole 134 can include tread, cleats, or other projections for further increasing traction. In other embodiments, outsole 134 can be a continuous, one-piece sheet or other body that extends across the sole structure 110.

Additionally, in some embodiments, the midsole 132 can include foam or other resiliently compressible material for providing cushioned support. Furthermore, in some embodiments, the midsole 132 can include a fluid-filled bladder 138. Stated differently, the bladder 138 can define a chamber 140 that contains a substantially sealed fluid within the bladder 138. The fluid can be a gas, liquid, or semi-fluid like a gel in some embodiments. Moreover, the bladder 138 can have relatively flexible walls and can be highly resilient and compressible. As such, the bladder 138 can provide relatively high cushioning and support for the wearer. As examples, the bladder 138 may incorporate various features or exhibit the general configurations of fluid-filled chambers disclosed in U.S. Pat. No. 7,556,846 to Dojan, et al.; U.S. Pat. No. 7,243,443 to Swigart; U.S. Pat. No. 6,571,490 to Tawney; U.S. Pat. No. 7,131,218 to Schindler; U.S. Patent Application Publication 2008/0276490 to Holt, et al.; and U.S. Patent Application Publication 2009/0151196 to Schindler, et al, each of which is incorporated by reference in its entirety.

Moreover, the bladder 138 can be formed from and/or include any suitable materials. A wide range of polymer materials may be utilized for the bladder 138. In choosing an appropriate material, the ability of the material to prevent the diffusion of the fluid contained within the bladder 138 may be considered, as well as the engineering properties of the material (e.g., tensile strength, stretch properties, fatigue characteristics, dynamic modulus, and loss tangent). When formed from a polymer material, the walls of the bladder 138 may have a thickness of approximately 1.0 millimeter, but the thickness may range from 0.25 to 4.0 millimeters or more, for example, depending upon the specific polymeric material utilized. Examples of thermoplastic polymer materials that may be suitable for the bladder 138 include urethane, polyurethane, polyester, polyester polyurethane, and polyether polyurethane. Various thermoset polymer materials may also be utilized for the bladder 138. More specific examples of materials that may be utilized include the various materials disclosed in any of (a) U.S. Pat. Nos. 4,183,156, 4,219,945, 4,936,029, and 5,042,176 to Rudy; (b) U.S. Pat. Nos. 5,713,141 and 5,952,065 to Mitchell, et al.; and (c) U.S. Pat. Nos. 6,013,340, 6,082,025, 6,127,026, 6,203,868, and 6,321,465 to Bonk, et al., each of which is incorporated by reference in its entirety.

Furthermore, the midsole 132 or other portion of the sole structure 110 can include a plate 136. In some embodiments, the plate 136 can form an upper portion of the sole structure 110 relative to the vertical axis 107, and the plate 136 can be positioned adjacent to upper 120. Also, the bladder 138 can form a middle portion of the sole structure 110 and can be positioned between the plate 136 and the outsole 132. In other embodiments, the plate 136 can be disposed between the bladder 138 and the outsole 132 relative to the vertical axis 107. The plate 136 can incorporate one or more teachings of U.S. Patent Publication No. 2012/0174432 to Peyton, which is incorporated by reference in its entirety.

The plate 136 can be formed from and include any suitable materials. For example, in some embodiments, the plate 136 can be formed from and/or include various non-foamed polymer materials. Examples of suitable polymer materials for the plate 136 can include thermoplastic and thermoset polyurethane, polyester, a combination of polyurethane and acrylonitrile butadiene styrene, nylon, and polymer block amide. Also, the plate 136 can have any suitable thickness. For example, in some embodiments, at least eighty percent of the plate 136 can have a thickness (i.e., distance between first and second surfaces 144, 146) between 0.5 and 2 millimeters. As such, the plate 136 can have high flexibility in some areas. However, the plate 136 can be strong and can withstand loading of the sole structure 110. Also, the plate 136 can distribute forces through the sole structure 110 such that pressure is unlikely to concentrate for added comfort.

The plate 136, bladder 138, and outsole 132 can be disposed in any suitable area of the footwear 100. For example, in some embodiments, the plate 136, bladder 138, and/or outsole 132 can extend from forefoot region 111 to heel region 114 and also from lateral side 115 to medial side 117. In other embodiments, the plate 136 and/or bladder 138 can be disposed in only a portion of sole structure 110, for example, in the heel region 114. Moreover, in some embodiments, the plate 136, bladder 138, and/or outsole 132 can be at least partially exposed to the exterior of the footwear 100. As such, the plate 136, bladder 138, and/or outsole 132 can at least partially define an exterior surface of the footwear 100.

The plate 136 can be generally stiffer and/or stronger than the bladder 138 in some embodiments. The plate 136 can additionally resist bending more than the bladder 138 in some embodiments. Moreover, the plate 136 can include one or more features that provide predetermined stiffness, strength, and/or bending resistance at predetermined areas of sole structure 110. The plate 136 can further be attached to bladder 138 in some embodiments. As such, the plate 136 can support and/or reinforce the bladder 138 in some embodiments.

Additionally, in some embodiments, the plate 136 can be used to form, shape, and/or deform the bladder 138 as it is being made. Thus, various manufacturing techniques are discussed below that can enhance manufacturing efficiency and/or reduce part count for the article of footwear 100.

Figure 4:
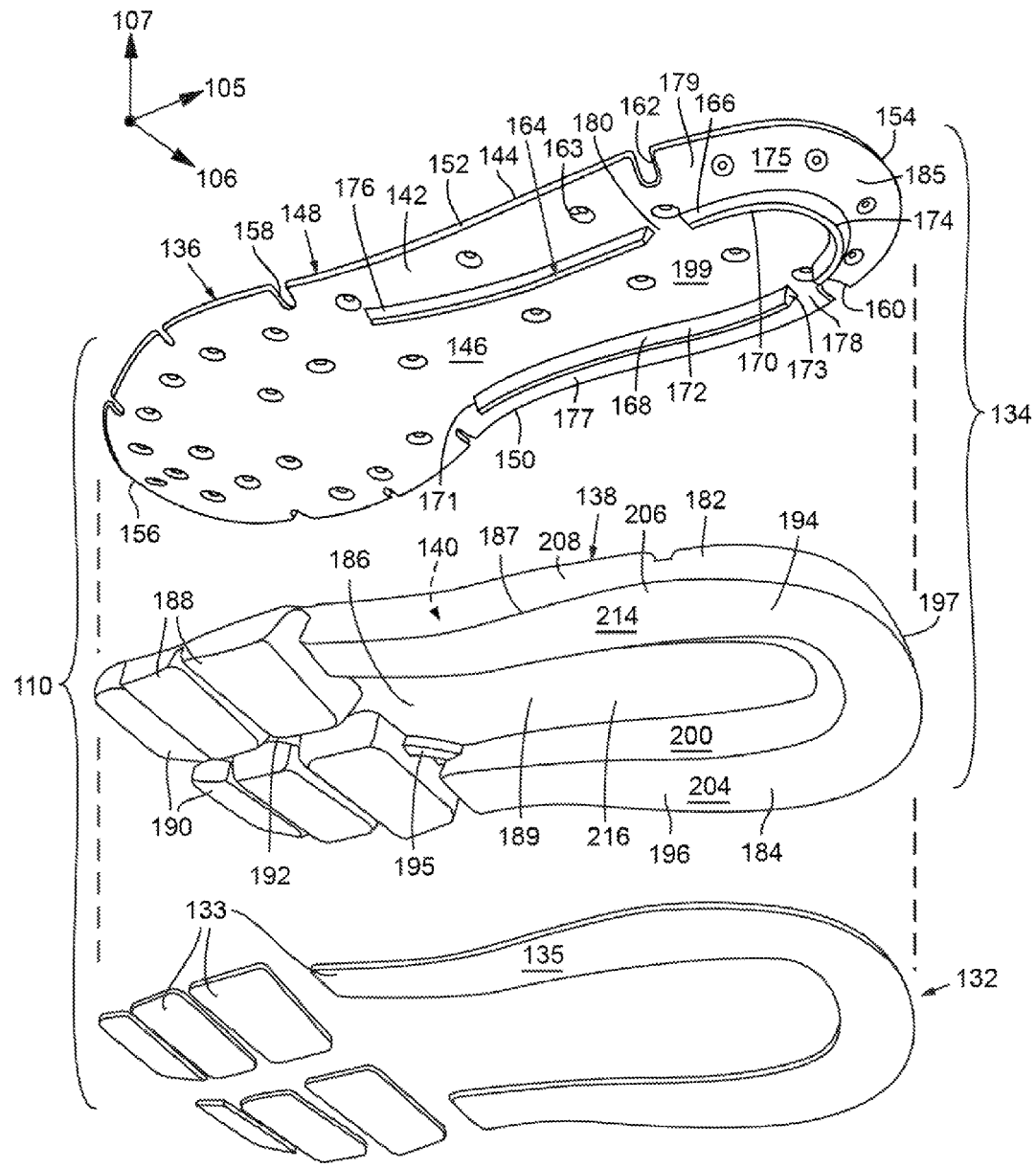
FIG. 4 is an exploded perspective view of the sole structure of the article of footwear of FIG. 1.
Figure 5:
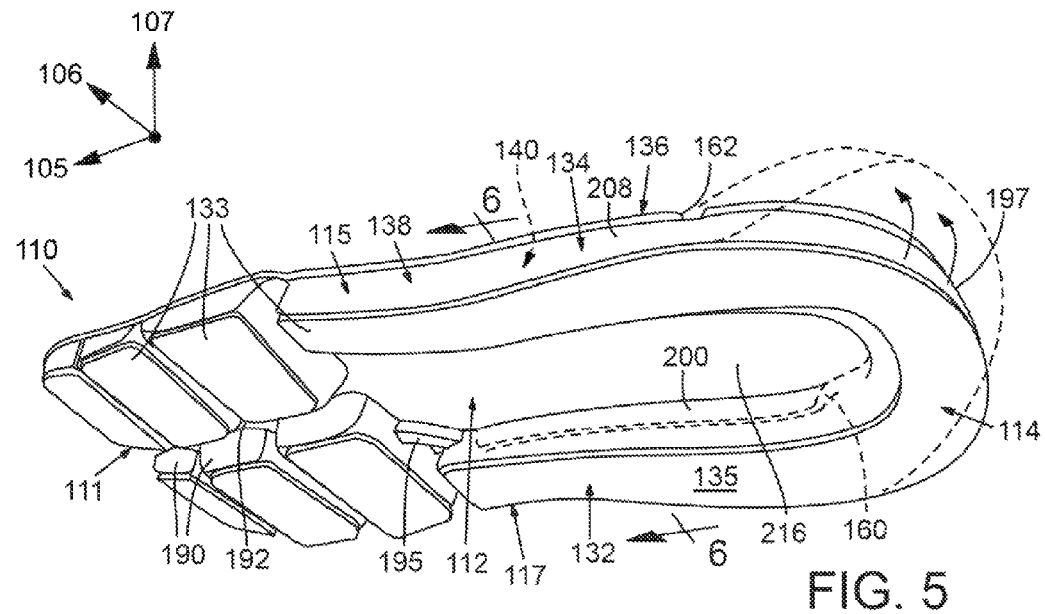
FIG. 5 is a bottom perspective view of the sole structure of the article of footwear of FIG. 1.
Figure 6:
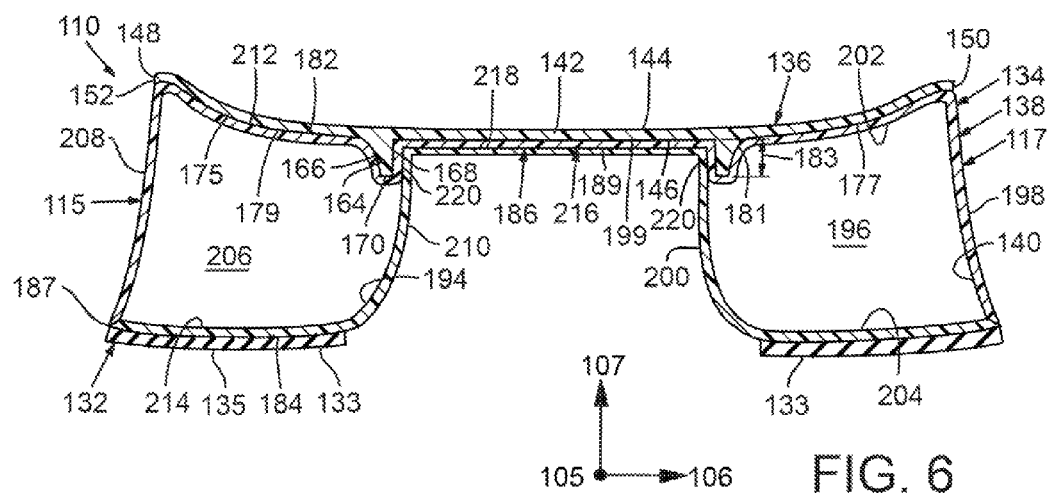
FIG. 6 is a section view taken along the line 6-6 of FIG. 5.

Referring now to FIGS. 3-6, the bladder 138 will be discussed in greater detail according to exemplary embodiments of the present disclosure. As shown in FIGS. 3 and 6, the bladder 138 can include a plurality of members that are spaced apart to define the chamber 140. In some embodiments, the chamber 140 can be attached together to form the chamber 140 and to contain a fluid within the chamber 140. In some embodiments, the members can be integrally attached. Also, in some embodiments the members can be bonded and/or fused together.

Specifically, in some embodiments, the bladder 138 can include a first member 182 and a second member 184. The first member 182 can be disposed above the second member 184; therefore, first member 182 can be referred to as an upper member and second member 184 can be referred to as a lower member in some embodiments. First member 182 and second member 184 can cooperate to define the chamber 140 and can be attached to form the chamber 140. Stated differently, the first member 182 and the second member 184 can be barriers that seal the fluid within the chamber 140. Furthermore, it will be appreciated that bladder 138 can include any number of members for defining chamber 140.

In some embodiments, first member 182 and second member 184 can extend generally along the longitudinal axis 105 as shown in FIG. 3 and along the transverse axis 106 as shown in FIG. 6. Additionally, in some embodiments, first member 182 and/or second member 184 can extend along the vertical axis 107.

At one or more areas of the bladder 138, the first member 182 can be spaced apart at a distance from the second member 184 to define the chamber 140. In other areas, the first member 182 and the second member 184 can abut, can be layered on each other, and can be connected directly each other. In these areas, the first and second members 182, 184 can be fused or bonded together in some embodiments. In other embodiments, the members 182, 184 can be attached via adhesives or fasteners. These connected areas can shape the bladder 138 and can limit fluid flow within the chamber 140.

In some embodiments, the bladder 138 can include a plurality of connected areas 186. The connected areas 186 can also be disposed in any suitable location of sole structure 110. As shown in FIG. 6, for example, the bladder 138 can include a peripheral connected area 187 and an interior connected area 189.

In some embodiments, the peripheral connected area 187 can be disposed proximate the medial side 117 and the lateral side 115. Additionally, as shown in the embodiments of FIG. 3, the peripheral connected area 187 can be disposed proximate the forefoot region 111 and the heel region 114. Thus, in some embodiments, the peripheral connected area 187 can extend about an outer periphery of bladder 138. Also, in some embodiments, the peripheral connected area 187 can extend continuously from heel region 114, along medial side 117, across forefoot region 111, and back along lateral side 115 to heel region 114. Moreover, in some embodiments, the peripheral connected area 187 can be spaced apart from the plate 136 and proximate the outsole 132. In other embodiments, the peripheral connected area 187 can be disposed proximate the plate 136 and spaced apart from the outsole 132.

The interior connected area 189 of bladder 138 can be spaced apart from the peripheral connected area 187 along the transverse axis 106 and/or along the longitudinal axis 105. The bladder 138 can also include any number of interior connected areas 189, and the interior connected areas 189 can be disposed in any suitable location within sole structure 110. For example, as shown in FIG. 6, the bladder 138 can include one or more interior connected areas 189 within heel region 114, and as shown in FIG. 3, the bladder 138 can include one or more interior connected areas 189 within forefoot region 111 and/or within midfoot region 112.

Additionally, chamber 140 can be subdivided into two or more sub-chambers 188 as shown in FIGS. 3 and 6. The sub-chambers 188 can be defined between the peripheral connected area 187 and one or more interior connected areas 189. In some embodiments, the sub-chambers 188 can be in fluid connection with each other such that fluid within one sub-chamber 188 can flow into another sub-chamber 188 via a channel or passage. In other embodiments, the sub-chambers 188 can be fluidly isolated from each other such that fluids are prevented from flowing between different sub-chambers 188.

As shown in FIGS. 1-6, the plurality of connected areas 186 and the plurality of sub-chambers 188 can provide the bladder 138 with a relatively high degree of three-dimensional curvature. These features can also provide the bladder 138 with a high degree of flexibility. Moreover, the connected areas 186 can be provided at predetermined areas where increased flexibility is desired. For example, the interior connected areas 189 can be provided within the forefoot region 111 to allow the bladder 138 to bend generally about the transverse axis 106 and/or the longitudinal axis 105.

Various embodiments of the plurality of sub-chambers 188 and the plurality of connected areas 186 will now be discussed in greater detail. As shown in FIGS. 1-5, the plurality of sub-chambers 188 can include a plurality of forward sub-chambers 190, which are disposed generally in the forefoot region 111 and the midfoot region 112. Also, the connected areas 186 can include a plurality of forward connected areas 192 that are disposed between respective pairs of forward sub-chambers 190.

The forward sub-chambers 190 can be generally cubic and hollow in some embodiments. As shown, the plurality of forward sub-chambers 190 can be arranged in one or more rows extending generally along the transverse axis 106. The plurality of forward sub-chambers 190 can also be arranged in one or more columns extending generally along the longitudinal axis 105. Specifically, in some embodiments, the bladder 138 can include six forward sub-chambers 190 that are arranged in three rows and that are arranged in two columns.

Moreover, as shown in FIGS. 3 and 4, the plurality of sub-chambers 188 can include a heel sub-chamber 194. As shown in FIG. 4, the heel sub-chamber 194 can be generally U-shaped. Also, in some embodiments, the heel sub-chamber 194 can extend continuously from the lateral side 115, across the heel region 114, to the medial side 117. Thus, the heel sub-chamber 194 can be subdivided into a medial portion 196, a heel portion 197, and a lateral portion 206.

Furthermore, connected areas 186 of bladder 138 can include a heel connected area 216. In some embodiments, the heel connected area 216 can be centered substantially in heel region 114 and midfoot region 112. As shown in FIG. 6, the heel connected area 216 can include a horizontal connected area 218 that extends generally along the transverse axis 106 and the longitudinal axis 105. The heel connected area 216 can also include a vertical connected area 220 that extends generally along the vertical axis 107. Additionally, the heel connected area 216 can be bordered at least partially by the heel sub-chamber 194.

Referring to FIG. 6, the heel sub-chamber 194 will be discussed in greater detail. For example, the medial portion 196 of the heel sub-chamber 194 can be defined by an external medial wall 198, an internal medial wall 200, an upper medial panel 202, and a lower medial panel 204 in some embodiments. These features can be arranged generally in a hollow rectangle shape, with the walls 198, 200 extending substantially along the vertical axis 107 and the panels 202, 204 extending substantially along the transverse axis 106. Likewise, the lateral portion 206 of the heel sub-chamber 194 can be defined by an external lateral wall 208, an internal lateral wall 210, an upper lateral panel 212, and a lower lateral panel 214. These features can be arranged generally in a hollow rectangle shape with the walls 208, 210 extending substantially along the vertical axis 207 and the panels 212, 214 extending substantially along the transverse axis 106. It will be appreciated that the heel portion 197 can be defined by features that are arranged with a corresponding rectangular shape.

Referring now to FIGS. 4 and 6-9, the plate 136 will be discussed in detail according to various exemplary embodiments. In some embodiments, the plate 136 can include a base 142. The base 142 can be a relatively wide and relatively thin platform that spans underneath the upper 120. In some embodiments, the base 142 can extend continuously between the forefoot region 111, the midfoot region 112, and the heel region 114. Also, in some embodiments, the base 142 can extend continuously between the lateral side 115 and the medial side 117.

The base 142 can include a first surface 144 that generally faces the upper 120. Thus, the first surface 144 can also be referred to as an upper surface of the base 142. The first surface 144 can also be configured to attach to the upper 120 in some embodiments. The first surface 144 can also be configured to support an insole, a layer of padding, or other articles that extend under the wearer's foot.

The base 142 can further include a second surface 146 that generally faces away from the first surface 144. Thus, the second surface 146 can also be referred to as a lower surface of the base 142. The second surface 146 can also be configured to connect directly to the bladder 138 in some embodiments.

Moreover, the base 142 can include a peripheral edge 148 that defines an outer periphery of the base 142 and that extends generally along the vertical axis 107, between the first and second surfaces 144, 146. The peripheral edge 148 can be sub-divided into a medial edge 150, a lateral edge 152, a heel edge 154, and a forefoot edge 156 in some embodiments represented in FIG. 7.

In some embodiments, the base 142 can be relatively flat and smooth. In other embodiments, the base 142 can have some curvature. For example, as shown in FIG. 8, the base 142 can be relatively flat over the majority of the base 142; however, the base 142 can curve upwards slightly at the peripheral edge 148 to, in effect, "cup" the wearer's foot.

Additionally, in some embodiments, the peripheral edge 148 of the base 142 can include one or more notches 158. The notches 158 can extend inwardly from the peripheral edge 148 along the transverse axis 106 and/or the longitudinal axis 105. In some embodiments, the base 142 can include a plurality of notches 158, and the notches 158 can be spaced apart from each other about the peripheral edge 148. In the heel region 114, for example, the base 142 can include a medial heel notch 160 and a lateral heel notch 162. In some embodiments, the medial heel notch 160 and/or the lateral heel notch 162 can be rounded. Other notches 158 of the base 142 can be similarly shaped. It will be appreciated that the notches 158 can increase flexibility of the base 142. More specifically, the flexibility of the base 142 can be greater proximate the notches 158 as compared to other areas of the base 142.

Moreover, in some embodiments, the base 142 can include one or more openings, holes, apertures, recesses, or other similar features. For example, as shown in the embodiments of FIGS. 4 and 7, the base 142 can include a plurality of through-holes 163 that are spaced inwardly from the peripheral edge 148 and that extend through the first and second surfaces 144, 146. As will be discussed in detail below, the through-holes 163 can be useful for manufacturing purposes in some embodiments.

The plate 136 can further include at least one rib 164. The rib 164 can be generally elongate and can extend along the longitudinal axis 105 and/or the transverse axis 106. The rib 164 can project from the base 142. Moreover, the rib 164 can be integrally connected to the base 142 in some embodiments such that the rib 164 and base 142 cooperate to define a one-piece, monolithic plate 136. In other embodiments, the rib 164 can be fastened, glued, and/or removably attached to the base 142.

The rib 164 can be disposed on any suitable area of the plate 136. For example, in some embodiments, the rib 164 can project from the second surface 146 of the base 142, toward the bladder 138. Also, in some embodiments, the rib 164 can extend across the heel region 114 of the plate 136. Additionally, in some embodiments, the rib 164 can extend across the midfoot region 112 of the plate 136. Specifically, as shown in FIGS. 4 and 7, the rib 164 can be generally U-shaped and can extend from the midfoot region 112 on the medial side 117, along the medial side 117 in the heel region 114, across the heel region 114, along the lateral side 115 in the heel region 114, to the midfoot region 112 on the lateral side 115. Furthermore, in some embodiments, the rib 164 can be spaced inwardly at a distance from the peripheral edge 148.

As shown in FIGS. 7 and 8, the rib 164 can have a first side surface 166, a second side surface 168, and an end surface 170. The first and second side surfaces 166, 168 can extend from the second surface 146 of the base 142. Also, the end surface 170 can extend between the first and second side surfaces 166, 168. The first side surface 166 can face generally outwardly toward the peripheral edge 148. Also, the second side surface 168 can face in an opposite, inward direction. Moreover, the end surface 170 and can face generally away from the second surface of the base 142 in some embodiments. In some embodiments, the second side surface 168 can be substantially flat as shown in FIG. 8, whereas the first side surface 166 can have a greater degree of curvature. For example, the first side surface 166 can include a relatively large radius 181 at the transition between the first side surface 166 and the second surface 146 of the base 142.

As shown in FIG. 6, the rib 164 can have a height 183 measured from the end surface 170 to the second surface 146 of the base 142. The rib 164 can have any suitable height. In some embodiments, for example, the height 183 of the rib 164 can be between approximately 0.5 centimeters and 2.5 centimeters.

In some embodiments, the rib 164 can be a continuous, uninterrupted body. In other embodiments, such as the embodiments of FIGS. 4 and 7, the rib 164 can include a plurality of segments. Specifically, the rib 164 can be sub-divided along its longitudinal axis into a first segment 172, a second segment 174, and a third segment 176. A first break 178 can be defined between the first segment 172 and the second segment 174, and a second break 180 can be defined between the second segment 174 and the third segment 176.

Moreover, in some embodiments, the first segment 172 can extend generally along the medial edge 150, the second segment 174 can extend generally along the heel edge 154, and the third segment 176 can extend generally along the lateral edge 152. Thus, the first segment 172 can be referred to as a medial segment, the second segment 174 can be referred to as a heel segment, and the third segment 176 can be referred to as a heel segment.

Still further, each of the segments 172, 174, 176 can include a first longitudinal end 171 and a second longitudinal end 173. In FIG. 7, the first longitudinal end 171 and the second longitudinal end 173 are indicated on the segment 172; however, it will be appreciated that the other segments 174, 176 can include respective ends 171, 173. The first break 178 and the second break 180 can be defined between respective pairs of the ends 171, 173 of the segments 172, 174, 176.

In some embodiments, the breaks 178, 180 can be recesses, notches, or other types of openings in the rib 164. Also, in some embodiments, the breaks 178, 180 in the rib 164 can expose the second surface 146 of the base 142. In other embodiments, the breaks 178, 180 are merely areas of reduced height of the rib 164. Thus, in some embodiments, the breaks 178, 180 can be recesses in the rib 164 such that the rib 164 covers the base 142 at the breaks 178, 180.

Additionally, in some embodiments, the breaks 178, 180 can be substantially aligned with respective ones of the notches 158 of the base 142. As such, areas of plate 136 including the notches 158 and breaks 178, 180 can have greater flexibility than other areas of plate 136.

As stated, the rib 164 can be spaced inwardly from the peripheral edge 148 of the base 142. As such, an outer area 175 of second surface 146 of base 142 can be defined, extending from the peripheral edge 148 to the rib 164. More specifically, in the embodiments of FIG. 8, the outer area 175 can include a medial outer area 177 that extends from the medial peripheral edge 150 to the first segment 172 of the rib 164. Also, as shown, the outer area 175 can include a lateral outer area 179 that extends from the lateral peripheral edge 152 to the third segment 176. Moreover, as shown in FIG. 7, the outer area 175 can include a heel outer area 185 that extends from the heel peripheral edge 154 to the second segment 174 of the rib 164.

Furthermore, the second surface 146 of the base 142 can include an intermediate area 199. The inner area 199 of the second surface 146 can extend between the first segment 172, the second segment 174, and the third segment 176.

It will be appreciated that the rib 164 can increase stiffness of respective areas of the plate 136. For example, the plate 136 can be bendable and otherwise flexible in the forefoot region 111. However, the plate 136 can resist such flexing in the midfoot region 112 and heel region 114 in areas where the rib 164 is included. Moreover, it will be appreciated that the breaks 178, 180 and the notches 158 in the peripheral edge 148 can increase flexibility of respective areas of the plate 136. Thus, the rib 164, the breaks 178, 180, and the notches 158 can be included at predetermined areas of the plate 136 for controlling the flexibility of the plate 136.

Moreover, the shape, dimensions, and surface features of the rib 164 can be preselected to provide the desired stiffness and flexibility for the plate 136. For example, the rib 164 can have a substantially constant height 183 along its length in some embodiments. In other embodiments, the height 183 can vary along its length, and areas of reduced height 183 can be more flexible than areas of increased height 183. Moreover, the cross sectional profile of the rib 164 represented in FIG. 8 can be substantially constant along the length of the rib 164 in some embodiments. In other embodiments, the cross sectional profile of the rib 164 can vary along its length.

As shown in FIG. 6, the rib 164 can be attached to the bladder 138. Specifically, the rib 164 can be attached to the first member 182 of the bladder 138. In some embodiments, the first member 182 can closely conform and nest against the rib 164. More specifically, the first member 182 can be attached to the first side surface 166, the second side surface 168, and the end surface 170 of the rib 164. In some embodiments, the first member 182 can be layered substantially continuously on the second surface 146 of the base 142, the first side surface 166, the second side surface 168, and the end surface 170. More specifically, the first member 182 can be layered on and attached to the medial outer area 177 of the base 142, the first rib segment 172, the intermediate area 199 of the base 142, the third rib segment 176, and the lateral outer area 179. Additionally, in some embodiments, the first member 182 can be layered on and attached to the heel outer area 185 of the base 142. Additionally, the first member 182 can be received within the breaks 178, 180 of the rib 164 and can be attached and layered on the exposed second surface 146 of the base 142 within the breaks 178, 180.

Thus, in some embodiments, the first member 182 can be layered continuously from the medial side 117 to the lateral side 115 of the sole structure 110. Moreover, the first member 182 of the bladder 138 can be layered continuously from the heel region 114 to the forefoot region 111. Additionally, in some embodiments, the first member 182 of the bladder 138 (i.e., the upper surface of the bladder 138) can closely conform to the shape and curvature of the second surface 146 of the base 142 and the surfaces of the rib 164.

Also, as shown in FIG. 6, the first member 182 and second member 184 can be layered on and attached to the plate 136, for example, at one or more connected areas 186. In some embodiments, the first member 182 and the second member 184 can be layered on the base 142 of the plate 136 at the horizontal connected area 218. As such, the first member 182 can be layered between the second member 184 and the intermediate area 199 of the base 142. Likewise, in some embodiments, the first member 182 and the second member 184 can be layered on the second side surface 168 of the rib 164. As such, the first member 182 can be layered between the second member 184 and the second side surface 168. Accordingly, there can be a relatively large surface area of attachment between the members 182, 184, the base 142, and the rib 164.

As such, in some embodiments, the plate 136 can support, increase stiffness, and/or reinforce the bladder 138. Moreover, because of the relatively large surface area contact between the bladder 138 and the plate 136, the plate 136 can ensure that the bladder 138 is unlikely to detach or otherwise fail.

When the footwear 100 is worn, the bladder 138 can deflect and deform under a compression load between the upper 120 and the outsole 110. This can provide cushioned for the wearer.

Moreover, when the wearer pushes off the ground generally along the transverse axis 106 (i.e., cuts to the side), the pushing force from the wearer can transfer through the plate 136 and the bladder 138. The rib 164 can readily resist deflection under these shear and other stresses. Also, because of the connection at the vertical connection area 220 and the second side surfaces 168 of the rib 164, the rib 164 can reinforce these areas of the bladder 138, allowing the bladder 138 to resist deflection, delaminating, etc. Accordingly, the wearer can cut to either side, and the sole structure 110 can readily support such cutting.

It will be appreciated that the sole structure 110 can provide flexibility at necessary areas as well. As described above, the breaks 178, 180 in the rib 164, the notches 158 in the base 142, and other features can increase flexibility in predetermined areas. Thus, as shown in FIG. 5, the sole structure 110 can flex, bend, or otherwise deform. Specifically, a neutral position of the sole structure 110 is shown in solid lines, and a flexed and bent position is shown in phantom in FIG. 5. As shown, the sole structure 110 can bend in a predetermined manner generally at the notches 158 and the breaks 178, 180 of the rib 164. The type of bending shown in FIG. 5 can occur, for example, when running when the heel region 114 initially strikes the ground. It will be appreciated that the other notches 158 and breaks 178, 180 can be included to allow other types of flexure. Thus, the sole structure 110 of the present disclosure provides advantageous support and stiffness in some regions and, yet, the sole structure 110 allows for flexure in predetermined areas.

Figure 10:
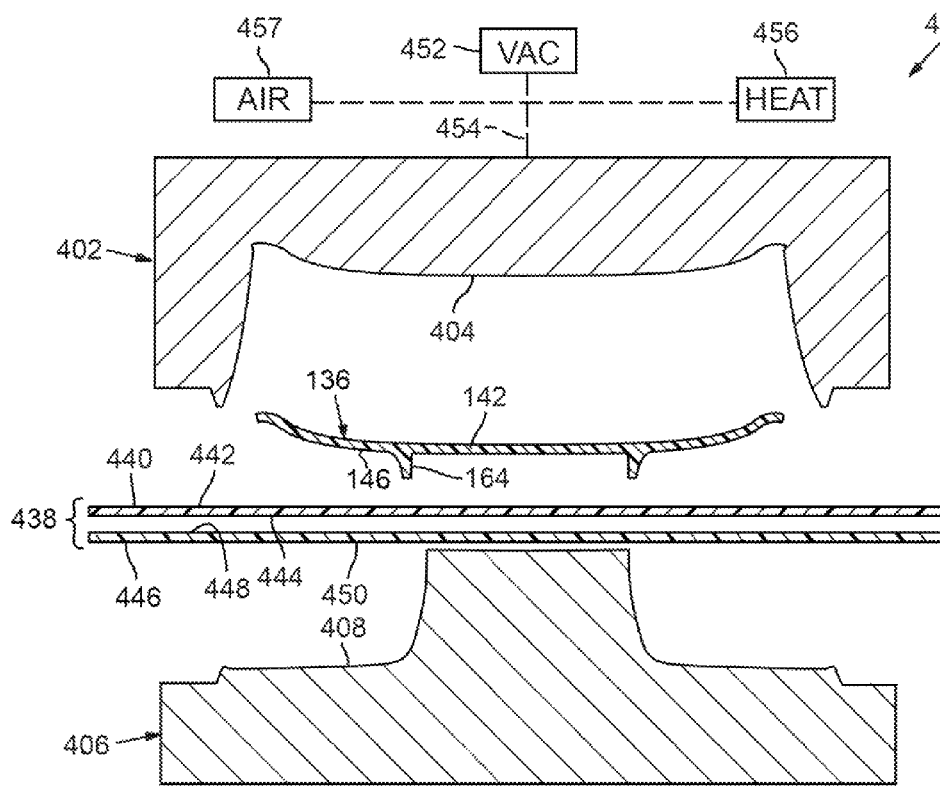
FIG. 10 is a schematic section view of a molding apparatus for at least partially manufacturing the sole structure of FIG. 5 according to exemplary embodiments of the present disclosure, wherein the molding apparatus is shown prior to manufacturing the sole structure.
Figure 11:
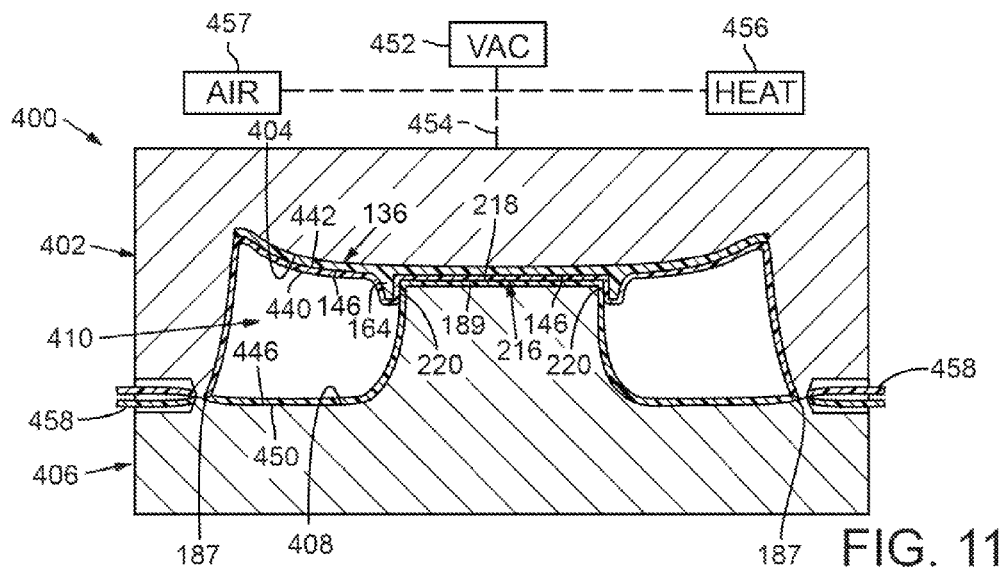
FIG. 11 is a schematic section view of the molding apparatus of FIG. 10 shown during manufacture of the sole structure.
Figure 12:
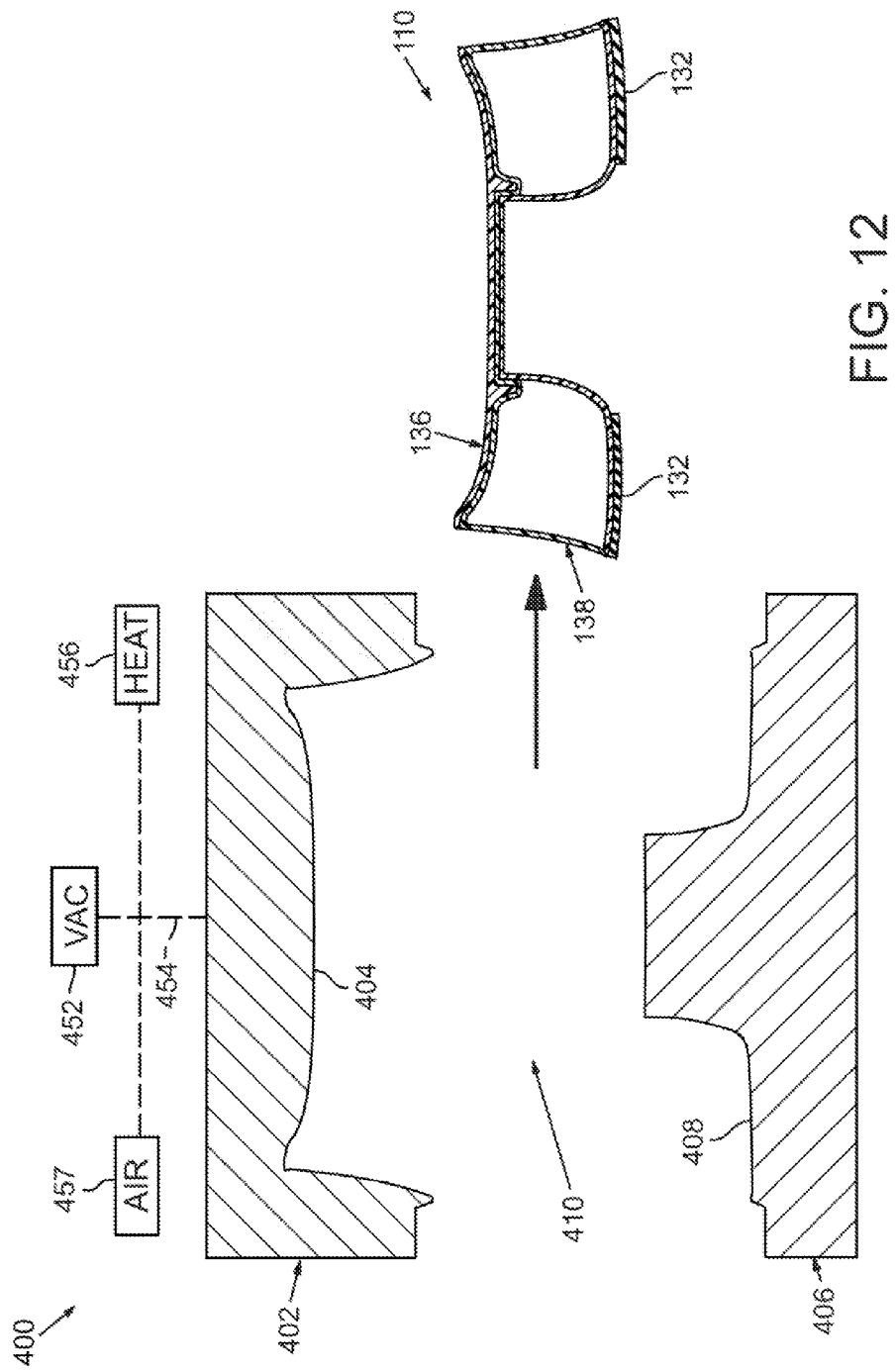
FIG. 12 is a schematic section view of the molding apparatus of FIG. 10 shown after manufacture of the sole structure.

Referring now to FIGS. 10-12, a method of manufacturing the sole structure 110 is illustrated according to exemplary embodiments. As shown, the sole structure 110 can be manufactured at least partially using a molding apparatus 400. For example, as will be discussed, the bladder 138 can be molded, formed, and shaped using the molding apparatus 400. Also, the bladder 138 can be attached to the plate 136 and shaped according to the surfaces of the plate 136 using the molding apparatus 400 in some embodiments. Accordingly, the bladder 138 can be formed with relatively complex and three-dimensionally curved surfaces. Also, the bladder 138 can be securely attached to the plate 136 using these methods. These manufacturing methods can also increase manufacturing efficiency and reduce the part count for the sole structure 110.

It will be appreciated that the molding apparatus 400 can be configured for performing known thermoforming processes in some embodiments. Also, in some embodiments, the molding apparatus 400 can be configured for performing known injection molding and/or blow molding processes. It will be appreciated, however, that the bladder 138 can be formed and/or attached to the plate 136 using other manufacturing techniques without departing from the scope of the present disclosure.

In some embodiments, the apparatus 400 can include a first mold member 402 with first mold surfaces 404 and a second mold member 406 with second mold surfaces 408. It will be appreciated that the first and second mold surfaces 404, 408 can cooperate to define a mold cavity 410 as shown in FIG. 11.

In some embodiments, the molding apparatus 400 can also include a vacuum source 452, a heat source 456, and an air source 457. The vacuum source 452, the heat source 456, and the air source 457 can be in communication with the mold members 402, 406 and/or the mold cavity 410 via one or more conduits 454. Thus, in some embodiments, the vacuum source 452 can provide suction to the mold cavity 410. Also, in some embodiments, the heat source 456 can heat the first and second mold members 402, 406, and/or the heat source 456 can heat objects within the mold cavity 410. Furthermore, in some embodiments, the air source 457 can provide pressurized fluid, such as air, into the mold cavity 410.

As shown in FIG. 10, the manufacturing process can begin by providing the plate 136 within the mold cavity 410. In some embodiments, the plate 136 can be provided substantially fully-formed as discussed above. For example, the plate 136 can be molded, for example, by injection molding processes prior to the molding steps represented in FIGS. 10-12.

Additionally, as shown in FIG. 10, a preform bladder member 438 can also be provided inside the mold cavity 410. The preform bladder member 438 can be any object or combination of objects used to form the bladder 138 discussed above. Stated differently, the preform bladder member 438 can be any object(s) that are manufactured, modified, transformed, or otherwise altered to form the bladder 138. Moreover, an object resembling the bladder 138 but that has not been inflated and sealed to contain air or other fluid can also be considered to be a preform bladder member 438.

In some embodiments represented in FIG. 10, the preform bladder member 438 can include a first preform member 440 and a second preform member 446. Both preform members 440, 446 can be sheets of polymeric material. The first preform member 440 can include an outer surface 442 and an inner surface 444. The second preform member 446 can include an outer surface 448 and an inner surface 450. Also, the preform members 440, 446 can be independent and detached from each other. The preform members 440, 446 can be layered over each other and overlapped such that the inner surfaces 444, 450 face each other as shown in FIG. 10. Also, the first preform member 440 can be provided between the second preform member 446 and the plate 136.

As shown in FIG. 11, the method can continue by moving the first and second mold members 402, 406 together to close off the mold cavity 410. Also, in some embodiments, the heat source 456 can heat up the molding apparatus 400 and/or the preform members 440, 446. As such, the preform members 440, 446 can be more moldable due to the increased temperature. Moreover, in some embodiments, the vacuum source 452 can provide suction to the mold cavity 410 to draw the plate 136 against the first mold surfaces 404 and to draw the first preform member 440 against the second surface 146 of the plate 136. Suction from the vacuum source 452 can also draw the second preform member 446 against the second mold surfaces 408. In some embodiments, the conduits 454 can be aligned and fluidly connected to the through-holes 163 in the plate 136 such that suction from the vacuum source 452 can draw the first preform member 440 against the second surface 146 through the plate 136. Additionally, in some embodiments, the air source 457 can provide pressurized air or other gas into the mold cavity 410 to push the plate 136 toward the first mold surfaces 404, the first preform member 440 against the second surface 146 of the plate 136, and/or the second preform member 446 against the second mold surfaces 408.

As represented in FIG. 11, the second preform member 440 can be stretched, plastically deformed, and shaped according to the second mold surfaces 408. Likewise, the first preform member 440 can be stretched, plastically deformed, and shaped according to the second surface 146 of the base 142 and the surfaces of the rib 164. Additionally, the first preform member 440 can become attached to the plate 136 as discussed above. Moreover, the first preform member 440 and the second preform member 446 can attach at the peripheral connected areas 187 and the interior connected areas 189. Additionally, one or more trim areas 458 of first and/or second preform members 440, 446 can be trimmed away from the rest of the article by the molding apparatus 400 as shown in FIG. 11. In some embodiments, the formation of the bladder 138 and the attachment of the bladder 138 to the plate 136 can occur substantially simultaneously (i.e., without having to repeatedly open and close the mold cavity 410) for added manufacturing efficiency.

In some embodiments, the bladder 138 can be largely formed via these molding processes, but at least one channel can remain open for inflating the bladder 138. The air source 457 can be used for introducing air or other fluid into the bladder 138 in some embodiments. Then, the bladder 138 can be sealed closed. In some embodiments, the inflation and/or subsequent sealing of the bladder 138 can occur using the molding apparatus 400 to further increase manufacturing efficiency.

Next, as shown in FIG. 12, the first and second mold members 402, 406 can be moved apart from each other, and the bladder 138 and attached plate 136 can be ejected from the mold cavity 410. Then, in some embodiments, the outsole 132 can be attached to the bladder 138. In other embodiments, the outsole 132 can be attached to the bladder 138 while the bladder 138 is disposed within the mold cavity 410. For example, in some embodiments, the outsole 132 can be insert molded for attachment to the bladder 138.

Figure 13:
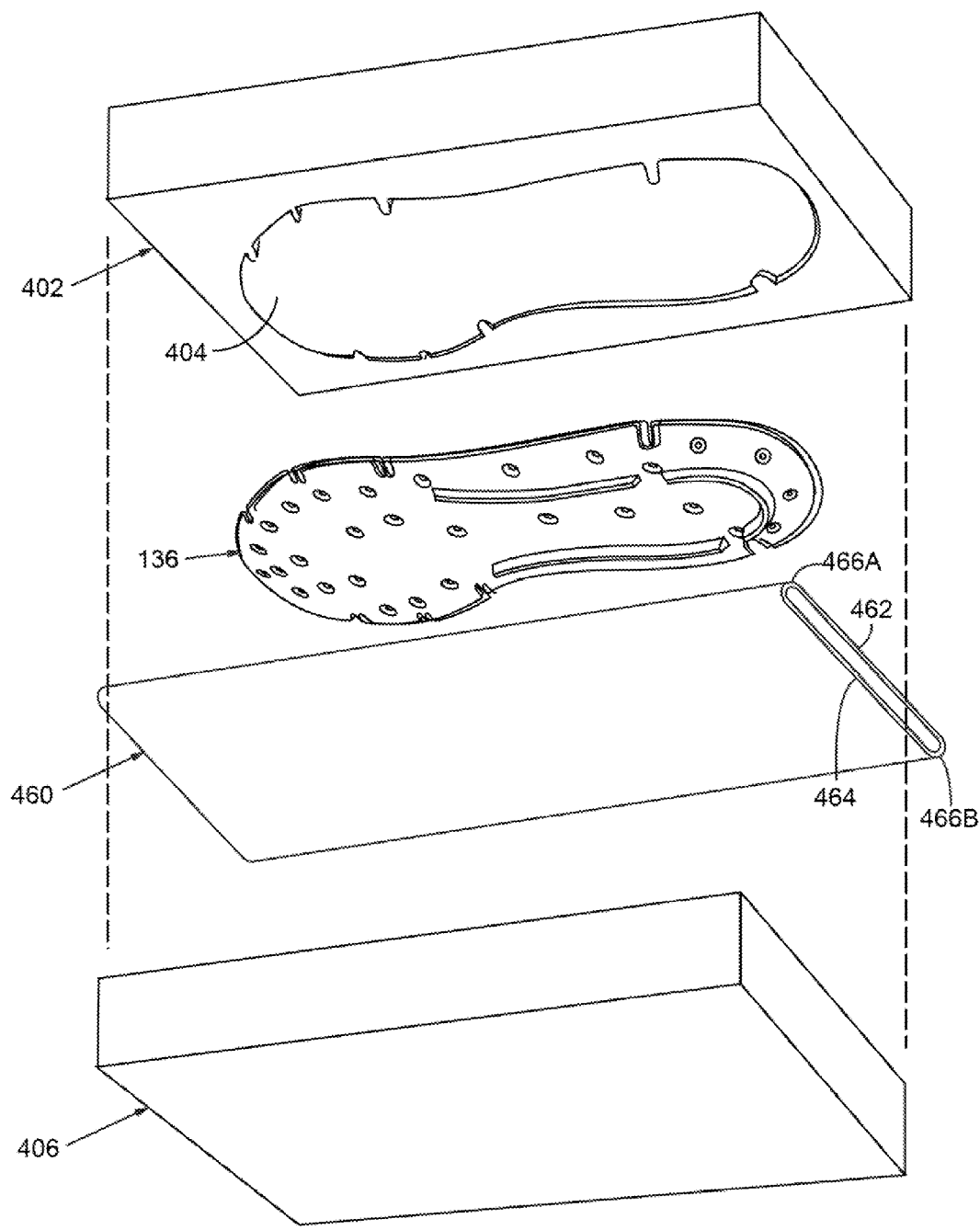
FIG. 13 is an exploded schematic view of the molding apparatus according to additional embodiments of the present disclosure.
Figure 14:
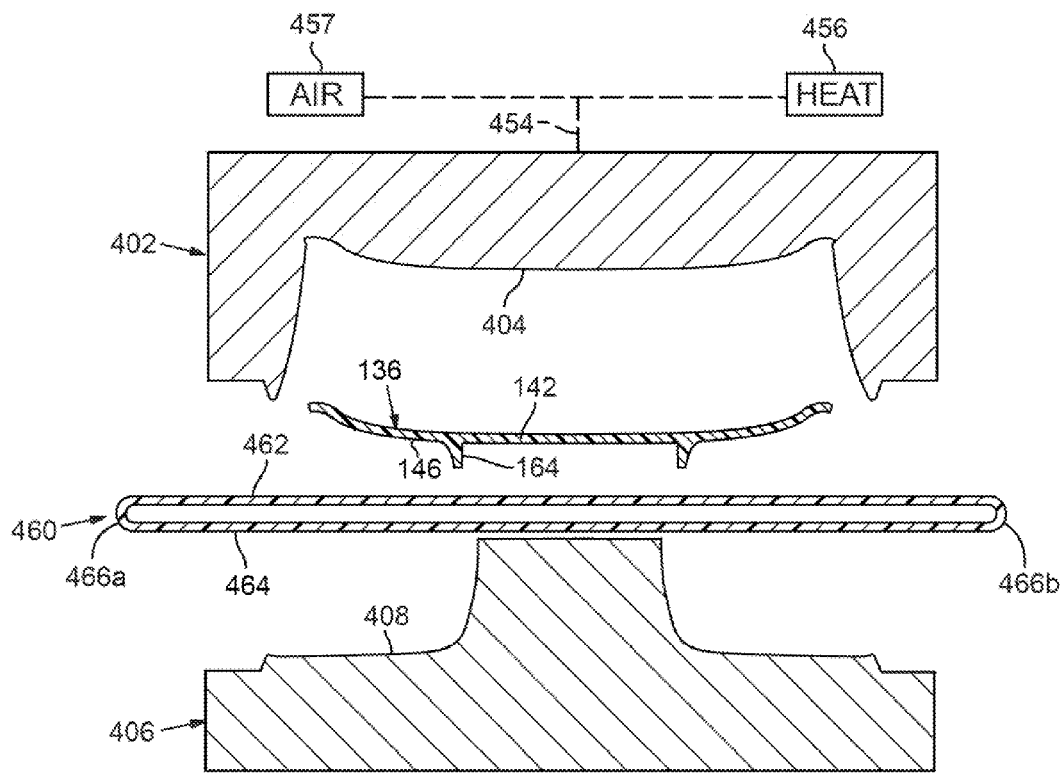
FIG. 14 is a schematic section view of the molding apparatus of FIG. 13 shown prior to manufacture of the sole structure.
Figure 15:
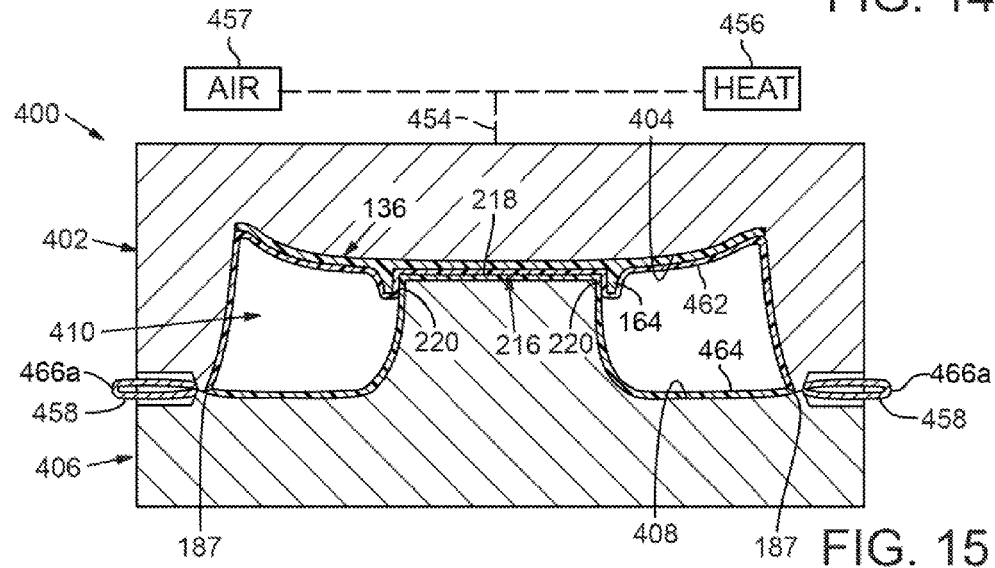
FIG. 15 is a schematic section view of the molding apparatus of FIG. 14 shown during manufacture of the sole structure.

Referring to FIGS. 13-15, manufacturing of the sole structure 110 is illustrated according to additional embodiments. As shown, the embodiments of FIGS. 13-15 can be substantially similar to the embodiments of FIGS. 10-12; however, the preform bladder member 438 can be different. Also, while the embodiments of FIGS. 10-12 illustrate a so-called thermoforming process, the embodiments of FIG. 13-15 can illustrate an injection molding process.

For example, as shown in FIGS. 13 and 14, the preform bladder member 438 can be a parison 460 having a first preform member 462 and a second preform member 464. Additionally, the parison 460 can include one or more attachment portions 466a, 466b that attach the first and second preform members 462, 464. For example, in some embodiments, the parison 460 can be relatively flat and tube shaped.

Additionally, as shown in FIGS. 13 and 14, the parison 460 can be introduced into the mold cavity 410 along with the plate 136. Then, as shown in FIG. 15, the mold cavity 410 can be closed. Also, in some embodiments, the air source 457 can provide pressurized air into the parison 460 to push the first preform member 462 and plate 136 toward the first mold surfaces 404 and to push the second preform member 464 toward the second mold surface 408. The heat source 456 can also increase the temperature of the mold members 402, 406, the first preform members 462, 464, and/or the mold cavity 410. As such, the bladder 138 can be shaped and attached to the plate 136, similar to the embodiments discussed above.

Once the sole structure 110 is formed, the sole structure 110 can be attached to the upper 120 using known methods. For example, once cooled, the sole structure 110 can be attached to the upper 120 using adhesives or fasteners.

Accordingly, the sole structure 110 can include a fluid-filled bladder 138 that provides cushioned support for increased wearer's comfort. This bladder 138 can include a plurality of chambers and can have a high degree of curvature. Also, the bladder 138 can be very flexible such that the sole structure 110 supports a wide range of movements of the wearer. However, the plate 136 can support and reinforce the bladder 138. For example, the rib 164 can directly attach to the bladder 138 for providing support and reinforcement to the bladder 138. Accordingly, the bladder 138 and plate 136 together can support the wearer's movements. Furthermore, because the plate 136 reinforces and supports the bladder 138, the bladder 138 is unlikely to detach, delaminate, and/or otherwise fail. Finally, the manufacturing of the bladder 138 and/or other portions of the sole structure 110 can be facilitated due to the plate 136.

While various embodiments of the present disclosure have been described, the description is intended to be exemplary, rather than limiting and it will be apparent to those of ordinary skill in the art that many more embodiments and implementations are possible that are within the scope of the present disclosure. Accordingly, the present disclosure is not to be restricted except in light of the attached claims and their equivalents. Also, various modifications and changes may be made within the scope of the attached claims.

What is claimed is:

1. A method of manufacturing a sole structure for an article of footwear, the sole structure configured to be attached to an upper of the article of footwear, the method comprising:
   providing a plate within a cavity of a mold, the plate including a base and a rib, the base including a first surface and a second surface, the first surface configured to face the upper, the second surface facing away from the first surface, the rib projecting from the second surface of the base;
   providing a first member and a second member within the cavity of the mold;
   forming a bladder from the first member and the second member using the mold, the bladder including an interior chamber configured to contain a fluid; and
   attaching the first member to the plate using the mold, wherein attaching the first member to the plate includes shaping the first member according to surfaces of the rib.

2. The method of claim 1, wherein the rib includes a first side surface, a second side surface, and an end surface that extends between the first and second side surfaces;
   wherein the first side surface and the second side surface extend away from the second surface of the base;
   wherein the end surface faces generally away from the second surface of the base; and
   wherein attaching the first member to the plate includes attaching the first member to the first side surface, the second side surface, and the end surface.

3. The method of claim 2, wherein attaching the first member to the plate includes continuously layering the first member across the first side surface, the second side surface, and the end surface.

4. The method of claim 1, wherein the plate includes an outer peripheral edge,
   wherein the rib is spaced from the outer peripheral edge to define an outer area of the second surface, the outer area extending from the peripheral edge to the rib; and
   wherein attaching the first member to the plate includes attaching the first member to the outer area.

5. The method of claim 1, wherein the rib includes a first segment, a second segment, and a break defined between the first and second segments;
   wherein the attaching the first member to the plate includes attaching the first member to the plate within the break.

6. The method of claim 1, wherein providing the first member and the second member within the cavity includes providing a parison within the cavity of the mold;
   wherein the parison includes the first member, the second member, and an attachment portion that connects the first and second members; and
   wherein attaching the first member to the plate includes blow-molding the parison to shape the first member according to the surfaces of the rib.

7. The method of claim 1,
   wherein forming the bladder includes attaching the first member and the second member together using the mold to define the interior chamber.

8. The method of claim 7, further comprising heating the first member and the second member prior to attaching the first member and the second member together.

9. The method of claim 1, further comprising attaching the first member and the second member at a connected area, and layering the connected area on the plate such that the first member is layered between the plate and the second member.

10. The method of claim 9, wherein layering the connected area on the plate includes layering the connected area on the base and the rib of the plate.

11. A method of manufacturing a sole structure for an article of footwear,
    the sole structure configured to be attached to an upper of the article of footwear, the method comprising:
    providing a plate within a cavity of a mold, the plate including a base and a rib, the base including a first surface and a second surface, the first surface configured to face the upper, the second surface facing away from the first surface, the rib projecting from the second surface of the base, the plate including an outer peripheral edge;
    providing a first member and a second member within the cavity of the mold;
    forming a bladder from the first member and the second member using the mold, the bladder including an interior chamber configured to contain a fluid; and
    attaching the first member to the plate using the mold, wherein attaching the first member to the plate includes shaping the first member according to surfaces of the rib;
    wherein the rib includes a first side surface, a second side surface, and an end surface, wherein the first side surface and the second side surface extend away from the second surface of the base, and wherein the end surface extends between the first and second side surfaces;
    wherein the rib is spaced from the outer peripheral edge to define an outer area of the second surface, the outer area extending from the peripheral edge to the rib;
    wherein the rib includes a first segment and a second segment, and wherein an intermediate area of the second surface is defined between the first segment and the second segment;
    wherein attaching the first member to the plate includes continuously layering the first member across the outer area, the first side surface, the second side surface, the end surface, and the intermediate area; and
    wherein forming the bladder includes layering the second member on the first member at an attachment area, wherein the attachment area is layered on the intermediate area and the second side surface.

12. The method of claim 11, wherein providing the first member and the second member within the cavity includes providing a parison within the cavity of the mold;

wherein the parison includes the first member, the second member, and an attachment portion that connects the first and second members; and wherein attaching the first member to the plate includes blow-molding the parison to shape the first member according to the surfaces of the rib.

13. The method of claim 11, wherein forming the bladder includes attaching the first member and the second member together using the mold to define the interior chamber.

14. The method of claim 13, further comprising heating the first member and the second member prior to attaching the first member and the second member together.

15. The method of claim 11, further comprising attaching the first member and the second member at a connected area, and layering the connected area on the plate such that the first member is layered between the plate and the second member.

16. The method of claim 15, wherein layering the connected area on the plate includes layering the connected area on the base and the rib of the plate.

* * * * *